(12) United States Patent
Maeng

(10) Patent No.: US 10,949,836 B1
(45) Date of Patent: Mar. 16, 2021

(54) MOBILE WALLET ELEMENT MANAGEMENT

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

(*) Notice: Subject to any disclaimer, the term of this patent is extended or adjusted under 35 U.S.C. 154(b) by 53 days.

(21) Appl. No.: 15/669,446

(22) Filed: Aug. 4, 2017

(51) Int. Cl.
*G06Q 40/00* (2012.01)
*G06Q 20/36* (2012.01)
*G06Q 20/02* (2012.01)
*G06Q 20/40* (2012.01)

(52) U.S. Cl.
CPC .............. *G06Q 20/36* (2013.01); *G06Q 20/02* (2013.01); *G06Q 20/405* (2013.01)

(58) Field of Classification Search
CPC ....................................................... G06Q 20/36
USPC ................................. 455/405; 705/26.1, 41
See application file for complete search history.

(56) References Cited

U.S. PATENT DOCUMENTS

| | | | |
|---|---|---|---|
| 6,442,526 B1 | 8/2002 | Vance et al. | |
| 7,974,982 B2 | 7/2011 | Christianson | |
| 8,140,361 B2 | 3/2012 | Fredericks et al. | |
| 9,760,702 B1* | 9/2017 | Kursun | G06Q 20/4016 |
| 2006/0212321 A1 | 9/2006 | Vance et al. | |
| 2009/0287600 A1 | 11/2009 | Amorosa et al. | |
| 2012/0310760 A1* | 12/2012 | Phillips | G06Q 40/02 705/26.1 |
| 2014/0038546 A1* | 2/2014 | Neal | G06Q 10/103 455/405 |
| 2017/0061402 A1* | 3/2017 | Mobin | G06Q 30/0643 |
| 2019/0043378 A1* | 2/2019 | Fishkov | G09B 7/00 |

* cited by examiner

*Primary Examiner* — Samica L Norman
(74) *Attorney, Agent, or Firm* — Schwegman Lundberg & Woessner, P.A.

(57) ABSTRACT

Disclosed in some examples are improved methods, systems, and machine-readable mediums that allow for organization and management of electronic wallets. Users may have parent wallet elements which may include one or more child wallet elements. When a user selects a parent wallet element, the parent wallet element includes one or more selection and usage rules which automatically selects an appropriate child wallet element to use in an appropriate situation. For example, when the parent wallet element is presented as payment at a merchant, the rules may be utilized to select one or more child payment elements. The rules may select the child element based upon transaction type (e.g., at a merchant the rules may select a payment element, at an identification station, choose an identification element), or other context of the user—e.g., selecting a particular payment element based upon the type of merchant, the amount of the transaction, the goods purchased, the date, the time, or the like.

20 Claims, 8 Drawing Sheets

US 10,949,836 B1

MOBILE WALLET ELEMENT MANAGEMENT

TECHNICAL FIELD

Embodiments pertain to computer systems for implementing electronic wallets (mobile wallets). Some embodiments relate to computer systems and messaging for mobile wallet element management.

BACKGROUND

A mobile wallet (also known as an electronic or digital wallet) refers to an application program executed by one or more computing devices (e.g., mobile devices such as a smartphone). The mobile wallet utilizes corresponding device memory to store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student IDs, library cards, membership cards, insurance cards, and so on. The mobile wallet application allows an individual to use the stored information to pay for items (either in person or in e-commerce transactions), provide for identification (e.g., producing a driver's license), transfer money to others, access bank accounts, collect discount coupons, submit subway passes, and the like. As another example, a mobile wallet may be used to verify the age of a buyer while purchasing alcohol or other age restricted goods or services. Exemplary mobile wallets include but are not limited to APPLE PAY®, ANDROID PAY®, GOOGLE WALLET, CURRENT C® by MCX®, SAMSUNG PAY®, and peer-to-peer payment apps such as VENMO®, SQUARE CASH®, and TILT APP®.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Organizations such as companies may wish to utilize mobile wallets to issue credentials, access cards, corporate credit cards, and other elements to their employees. The company, however, may wish to establish one or more controls on these elements. Additionally, employees may not wish to clutter their own personal mobile wallets with a plethora of business related elements. In a general sense, users with many mobile wallet elements may not appreciate a cluttered mobile wallet environment.

Disclosed in some examples are improved methods, systems, and machine-readable mediums that allow for organization and management of electronic wallets. Users may have parent wallet elements which may include one or more child wallet elements. When a user selects a parent wallet element, the parent wallet element includes one or more selection and usage rules which automatically selects an appropriate child wallet element to use in an appropriate situation. For example, when the parent wallet element is presented as payment at a merchant, the rules may be utilized to select one or more child payment elements. The rules may select the child element based upon transaction type (e.g., at a merchant the rules may select a payment element, at an identification station, choose an identification element), or other context of the user—e.g., selecting a particular payment element based upon the type of merchant, the amount of the transaction, the goods purchased, the date, the time, or the like.

Mobile wallet elements may also have one or more usage rules. For example, rules which specify allowed expenses, rules which cause the mobile wallet to communicate directly with a third party (e.g., an issuing company or organization) upon using the element, rules which specify contexts of the user in which usage of the element is appropriate, or the like. For example, a company may issue a parent wallet element that establishes usage rules for child mobile wallet elements such as a company credit card. These usage rules may specify the types and amounts of allowable expenses, as well as directing the mobile wallet to send a notification to the company when elements are utilized. The company may use these notifications to track usage of the mobile wallet elements, track expenses, and to reduce fraud by cross-checking the information reported by the issuer (e.g., the bank or credit card company) with the information reported by the mobile wallet to the company. Charges reported by the issuer but not the mobile wallet may be an indication of fraudulent activity.

Figure 1:
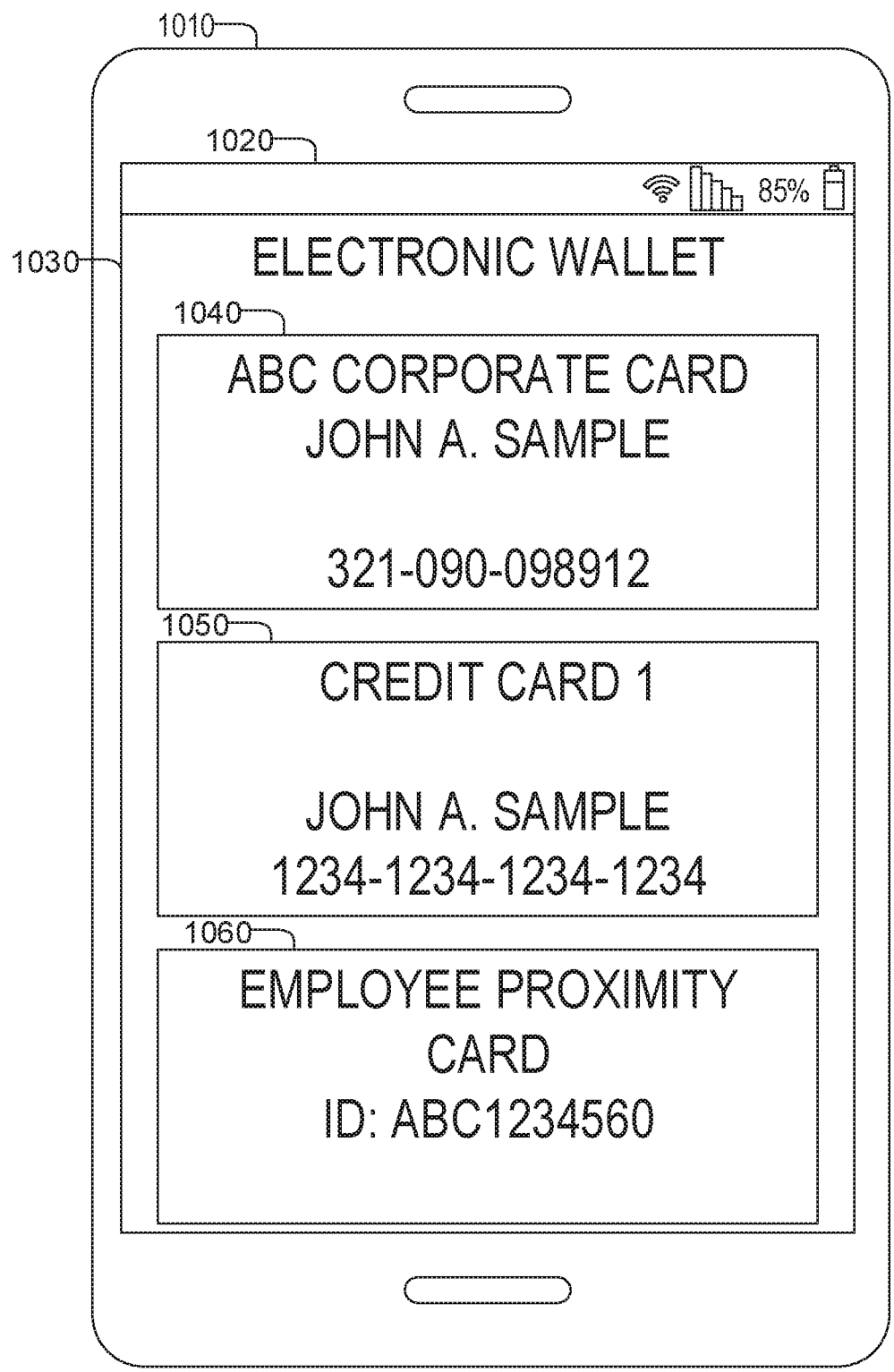
FIG. 1 shows a mobile wallet application executing within a display of a mobile device according to some examples of the present disclosure.

FIG. 1 shows a mobile wallet application 1030 executing within a display 1020 of a mobile device 1010 according to some examples of the present disclosure. Payment element 1040 in the form of a corporate credit card is shown along with a personal credit card payment element 1050, and an employee proximity card non-payment element 1060. These elements are selectable. For example, by selecting the corporate card payment element 1040, the mobile device may execute code associated with the corporate card payment element 1040 and in some examples, route communications received from a Near Field Communications transceiver to the selected element. The selected element may then pay for goods or services using an account corresponding to the corporate card payment element 1040. In other examples, other communication protocols and standards may be utilized, for example, BLUETOOTH®, WIFI®, and the like. In the example of FIG. 1, the user's corporate and personal elements are intermingled and un-organized. A user may mistakenly utilize a corporate card for personal expenses, or vice versa.

Figure 2:
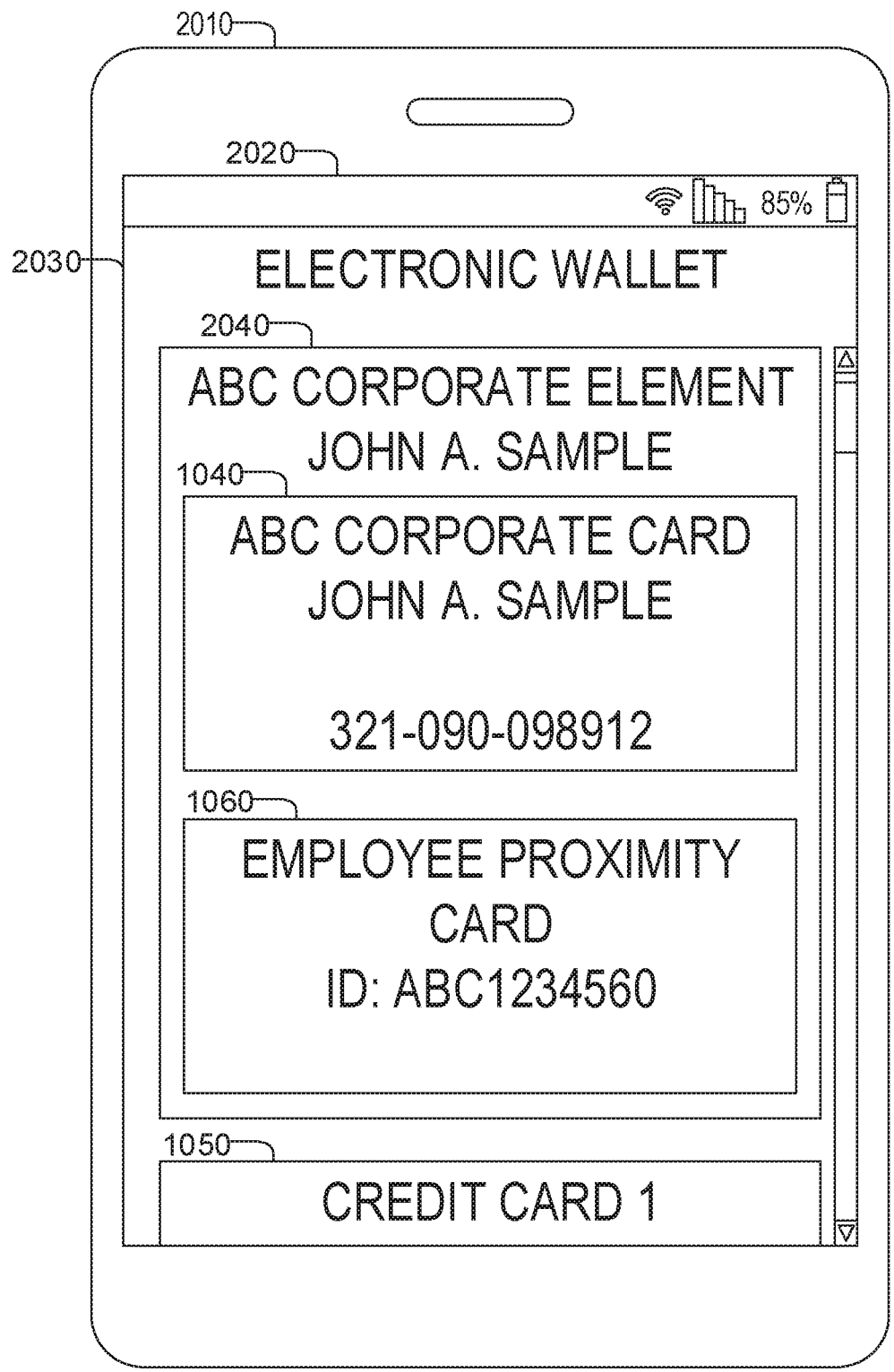
FIG. 2 shows a mobile wallet application executing within a display of a mobile device according to some examples of the present disclosure.

FIG. 2 shows a mobile wallet application 2030 executing within a display 2020 of a mobile device 2010 according to some examples of the present disclosure. In the example of FIG. 2, a parent element 2040, ABC Corporate element, contains child elements, corporate card payment element 1040, and employee proximity card non-payment element 1060. Corporate card payment element 1040 and employee proximity card non-payment element 1060 may be provisioned before or after the ABC corporate element parent element 2040. For example, elements may be provisioned as child elements, or may be later assigned as child elements (e.g., through a drag and drop process by the user, or via a provisioning update sent from an element issuer). Parent elements such as ABC Corporate element parent element 2040 may be initially displayed in a minimized state, showing only the parent element information (and in some examples, icons, thumbnails, or other information reflecting the child elements associated with the parent element), but upon selection may show the child element information, such as shown in FIG. 2. This helps to simplify the organization of the mobile wallet.

Figure 3:
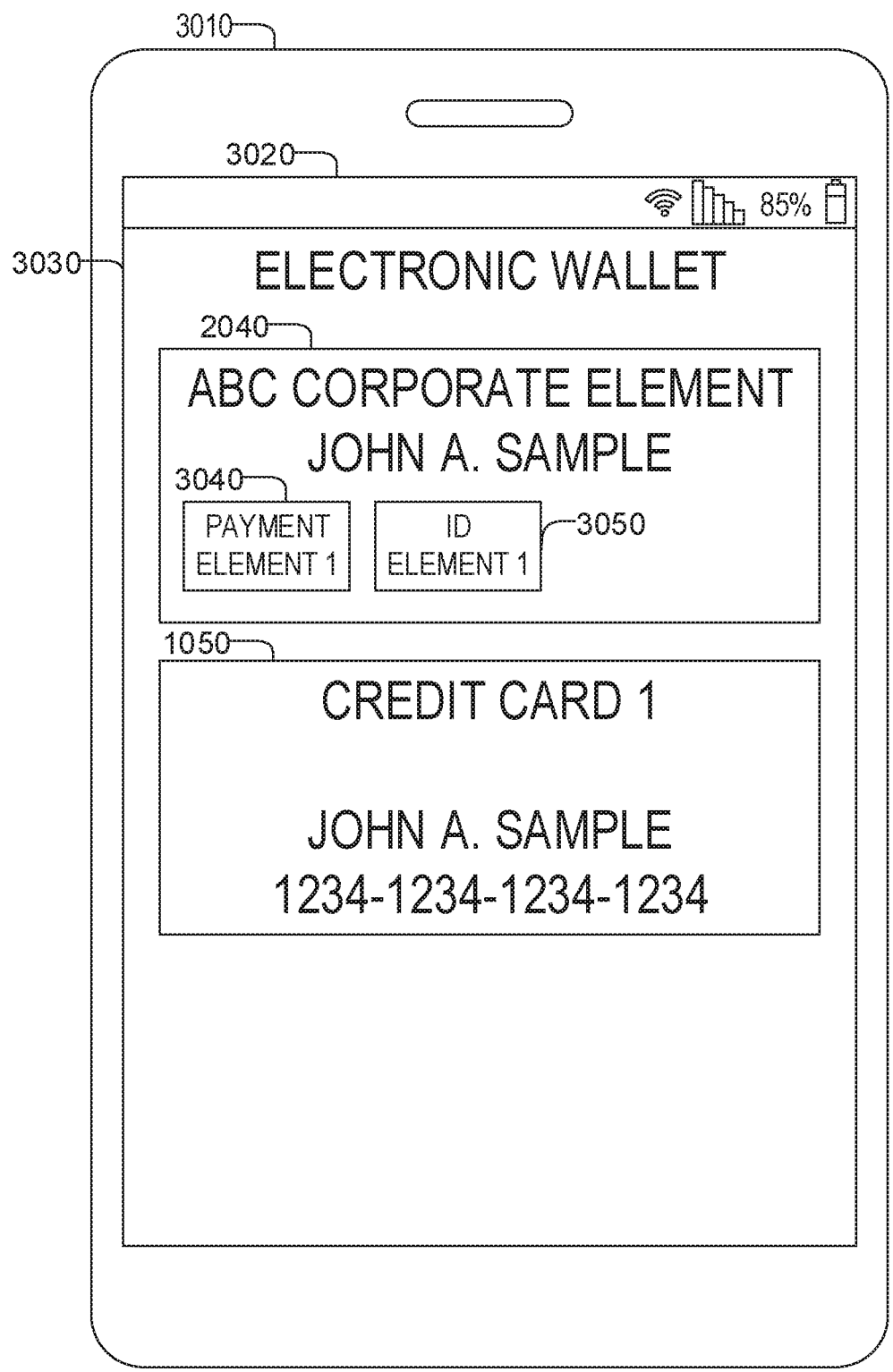
FIG. 3 shows a mobile wallet application executing within a display of a mobile device according to some examples of the present disclosure.

FIG. 3 shows a mobile wallet application 3030 executing within a display 3020 of a mobile device 3010 according to some examples of the present disclosure. ABC Corporate parent element 2040 is not selected and displays icons 3040 and 3050 of child elements. These icons may be thumbnail representations (e.g., digital images) of the child elements within the mobile wallet element. In some examples, the thumbnails may be selected such that the user may select a child element without selecting the parent element first. In some examples in which selection rules automatically select a payment element, manually selecting the element may bypass these rules. In other examples, the user may only select child elements that are appropriate for the user's current context as determined by the selection rules. For example, other mobile wallet elements that are not appropriate based upon the selection rules and the current context of the user may be grayed out or otherwise unselectable.

Figure 4:
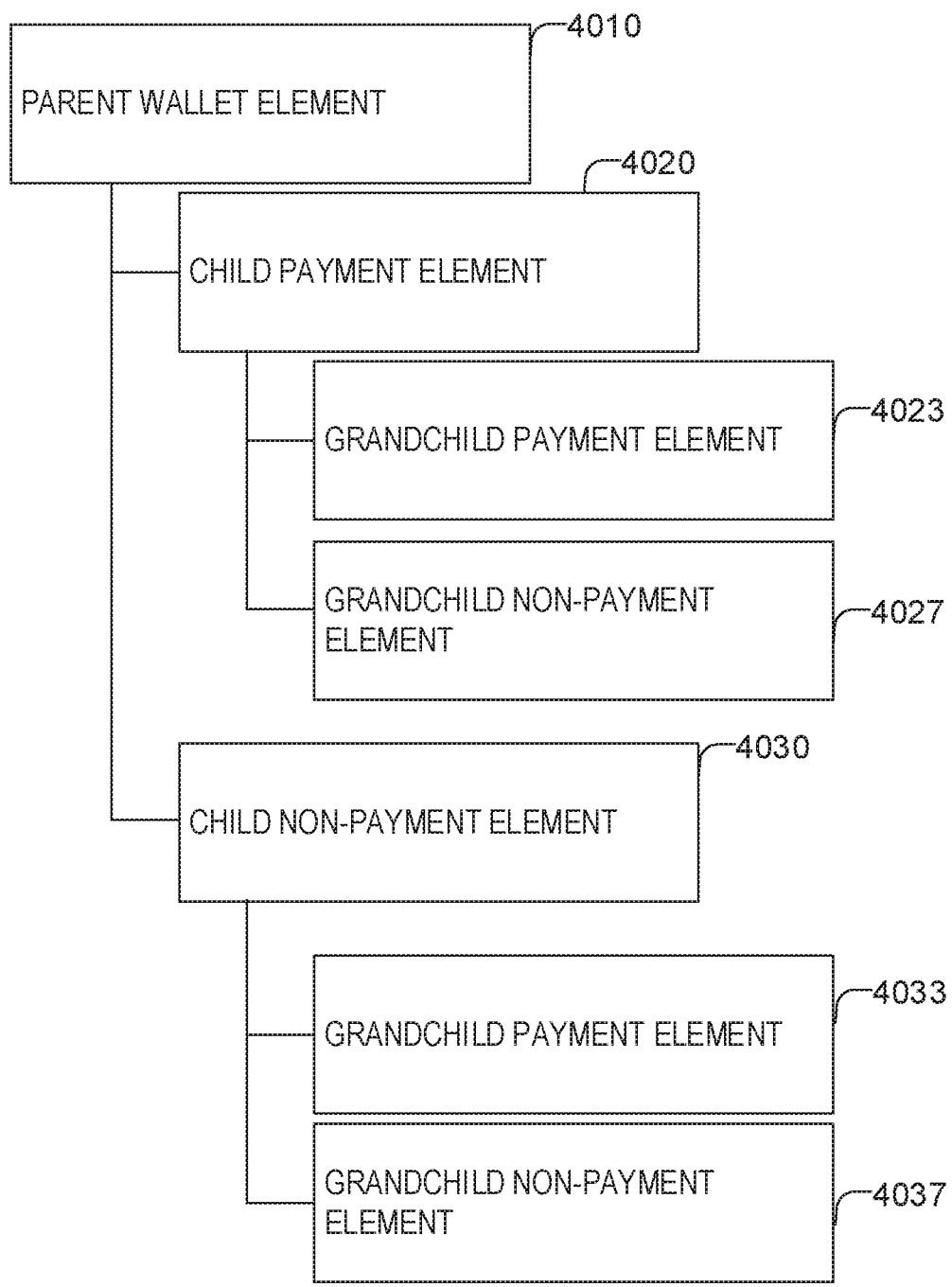
FIG. 4 shows a chart of an example organization of a mobile wallet with a parent wallet element according to some examples of the present disclosure.

FIG. 4 shows a chart of an example organization of a mobile wallet with a parent wallet element 4010. Parent wallet element may have zero or more child payment elements, such as child payment element 4020 and zero or more child non-payment elements, such as child non-payment element 4030. Each child element may then have their own child elements (either payment or non-payment). These "grandchild" elements may have their own child elements, and so on. For example, child payment element 4020 has a grandchild payment element 4023 and a grandchild non-payment element 4027. Similarly, child non-payment element 4030 contains grandchild payment element 4033 and grandchild non-payment element 4037. In some examples, the mobile wallet application may store the organization of parent and child elements according to an internal data structure such as a graph or tree. For example, each mobile wallet element may have a datastructure that stores information about the mobile wallet element. Example information includes the type of element, usage rules for the mobile wallet element, a list (e.g., a linked list) of child mobile wallet elements, a list (e.g., a linked list) of selection rules, and the like.

As previously noted, the parent element may have a set of one or more selection rules that automatically or semi-automatically selects a particular child element for a particular transaction. In turn, each child element that has a grandchild may have selection rules. Thus, the parent element may pass control to the indicated child node, who may then pass control (based upon their selection rules) to the indicated grandchild and so on, until the proper element is selected. For example, each mobile wallet element may include executable code that is executed when selected. In addition usage rules also may be nested. For example, the parent element's usage rules may limit each child's usage, each child may limit the grandchild element usage, and so on.

Figure 5:
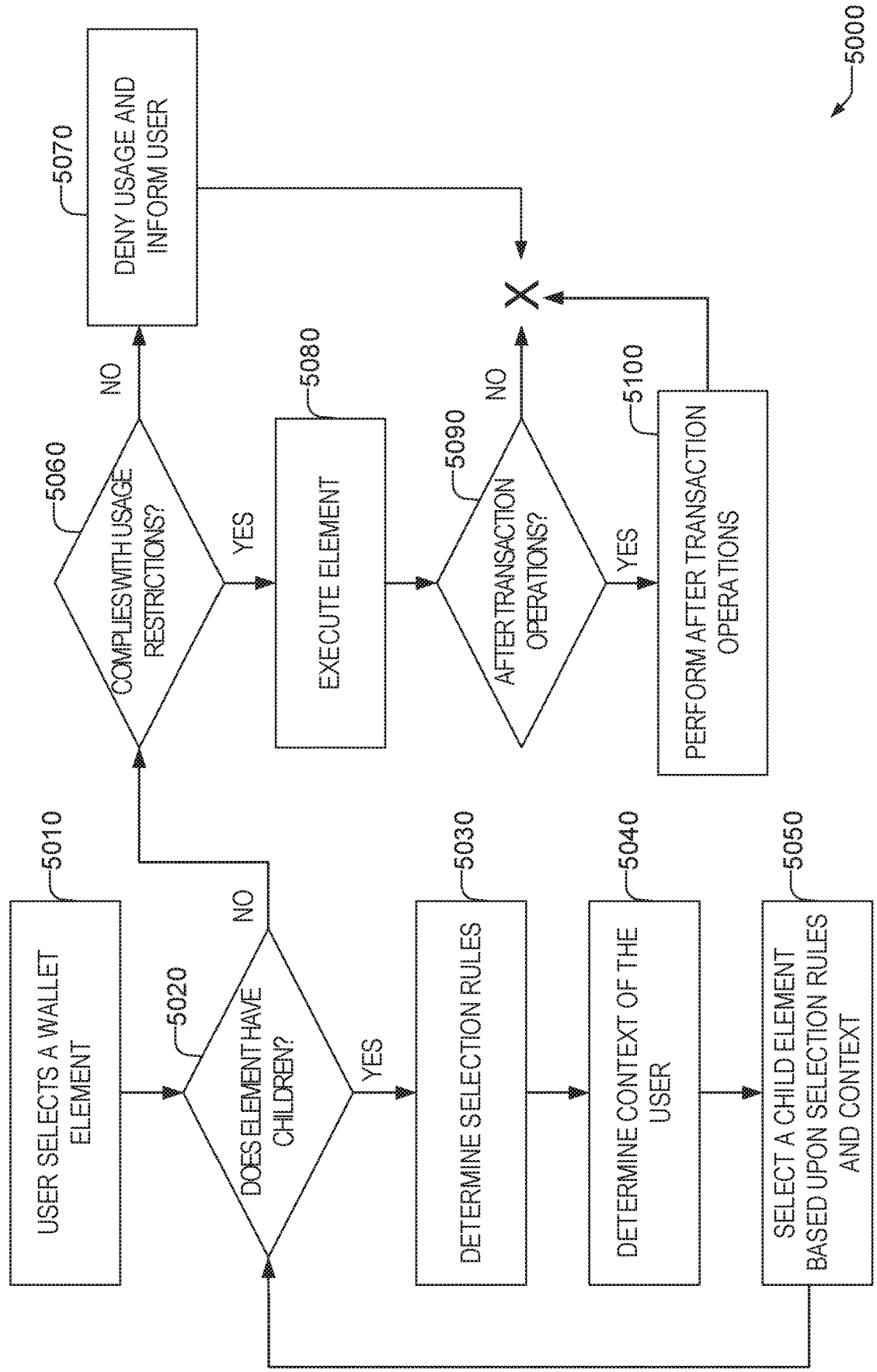
FIG. 5 shows a flowchart of a method for utilizing a payment element according to some examples of the present disclosure.

Turning now to FIG. 5 a flowchart of a method 5000 for utilizing a payment element is shown according to some examples of the present disclosure. At operation 5010, the user selects a wallet element. At operation 5020 a check is made to determine whether the element has child elements. If the element has child elements, then at operation 5030 the mobile wallet application may determine selection rules for selecting among the child elements. For example, the mobile wallet application may lookup the selection rules indicated by or stored in a data structure describing the mobile wallet element. At operation 5040, in some examples, the mobile wallet application may determine a context of the user. For example, what transaction the user is trying to complete, the user's location, a fingerprint of the user, motion of the user, time of day, day of the week, date, and the like. This context may be utilized along with the selection rules to select a child element at operation 5050. The selection rules may be of the form: if <context> then select <child element>. For example, if it is a Tuesday and it's a payment transaction, then select child element 1. In another example, if the transaction is a payment transaction, utilize child element 1, else if the transaction is an identification transaction, utilize child element 2.

As noted previously the child element may itself have children. At operation 5020 the determination is once again made whether the selected element has a child element. If so, then operations 5030-5050 may be repeated (in some examples, operation 5040 may not be executed again if the context information needed to evaluate the selection rules is already known). As diagrammed in FIG. 5 elements with child elements are not themselves selected for use—i.e., they are containers for holding and selecting child elements. In other examples, a parent element may be selected for use in a transaction based upon the selection rules.

Once an element is selected, at operation 5060 the usage rules of the selected element may be determined and the current usage may be compared with the usage restrictions (if any) on the element. For example, a usage rule may limit transactions with a particular element to $500.00 a day. If the usage does not comply with the usage restrictions, then at operation 5070, the usage may be denied and the user informed. In some examples, the issuer may also be informed (e.g., as in operation 5100) of the attempt to use the element in a manner inconsistent with the usage restrictions. If the usage complies with the usage restrictions, the element may be executed or utilized at operation 5080 to perform the transaction. At operation 5090 if the element has usage rules that specify after-transaction operations (e.g., such as communicating with a third party), then at operation 5100, the mobile wallet application may perform the after transaction operations. For example, the usage rules may specify that after the transaction is completed that the mobile wallet application is to notify a third party that is was not part of the transaction (e.g., that was not the issuer that approved the transaction). For example, reporting the transaction to a company accounting department for expense reporting, categorization, and the like. In some examples, the usage rules and the selection rules may be similar or the same. Thus an element that is not appropriate for a particular context of the user may not be selected. In these examples, there may be no usage rule checking.

Figure 6:
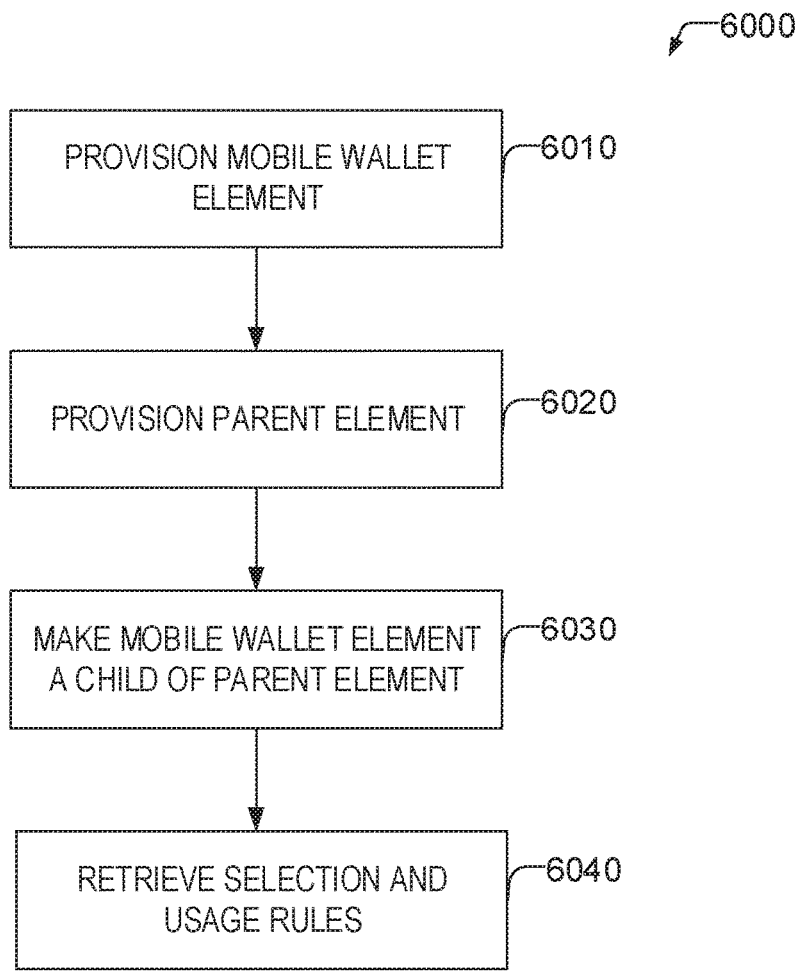
FIG. 6 shows a flowchart of a method of provisioning a parent mobile wallet element and adding a child mobile wallet element according to some examples of the present disclosure.

Turning now to FIG. 6, a flowchart of a method 6000 of provisioning a parent mobile wallet element and adding a child mobile wallet element is shown according to some examples of the present disclosure. At operation 6010 a mobile wallet element may be provisioned. For example a trusted service manager or other network based service may provision the credentials to a secure memory area of the computing device that is executing the mobile wallet application. Provisioning may involve loading the executable code element of the mobile wallet element, creating and loading credentials (e.g., a token, an account #), or the like. At operation 6020 a parent element may be provisioned using the same process as that of a mobile wallet element that was done at operation 6010. In some examples, the order of the operations 6010 and 6020 may be reversed. At operation 6030 the mobile wallet element provisioned at operation 6010 may be made a child element of the parent element provisioned at operation 6020. This may be done responsive to the provisioning of the parent element at operation 6020. For example, the parent element may include a list of elements that should be made children provided by the provisioning computer or issuer. At operation 6040 the system may retrieve selection and usage rules. In other examples, the selection and usage rules may be part of the provisioning process of the parent element at operation 6020.

Figure 7:
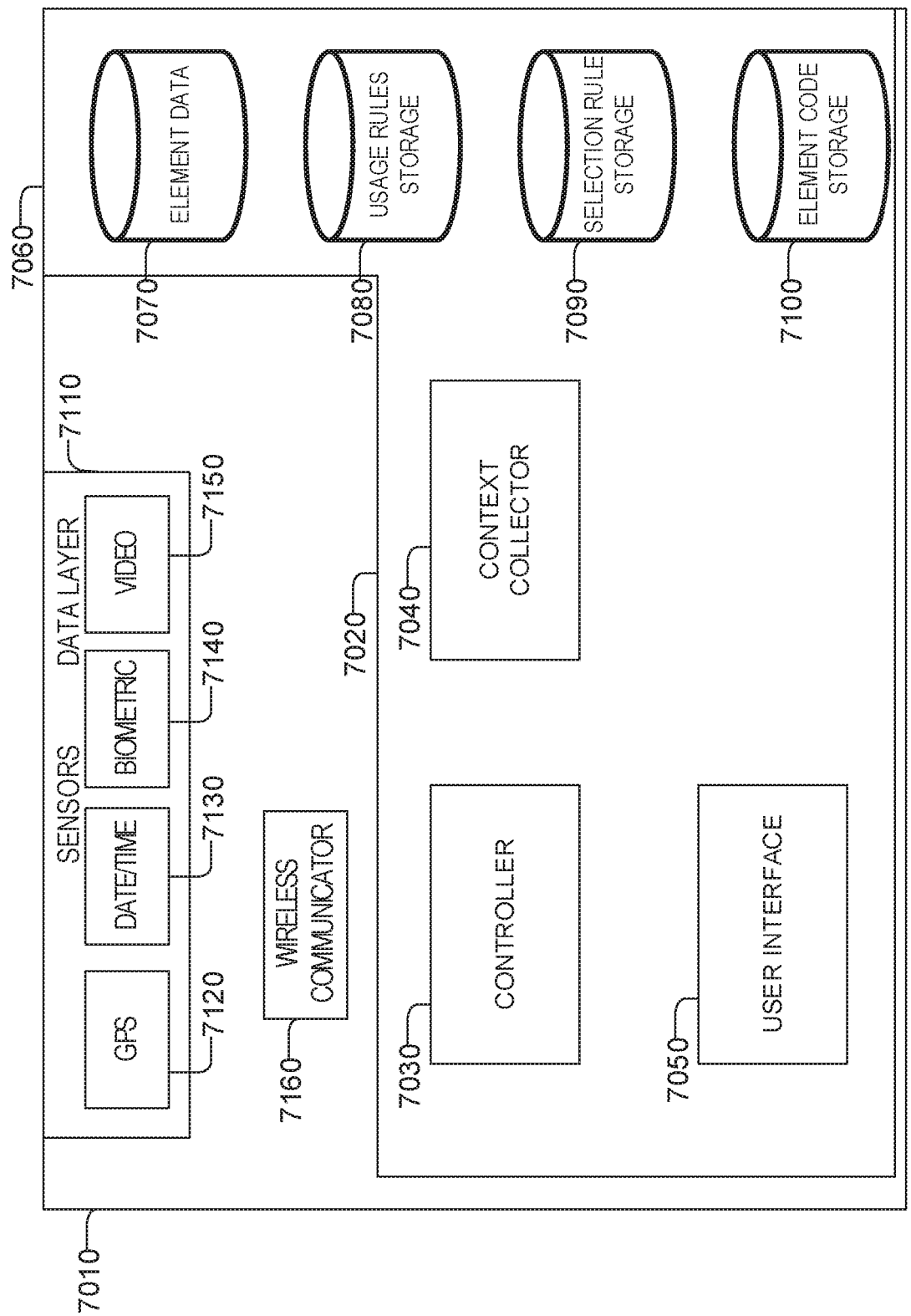
FIG. 7 shows a logical block diagram of a mobile wallet application executing on a user's computing device according to some examples of the present disclosure.

Turning now to FIG. 7 a logical block diagram of a mobile wallet application 7020 executing on a user's computing device 7010 is shown according to some examples of the present disclosure. The user may run a mobile wallet application 7020 which may include a controller 7030, a context collector 7040, a user interface creator 7050, and may include a data layer 7060. Data layer 7060 may include element data storage 7070 which may store information about mobile wallet elements such as information on child elements (e.g., a pointer to a data structure of the child element), a pointer to usage rules for the element stored in usage rules storage 7080, a pointer to selection rules stored in selection rules data storage 7090 and a pointer to executable code for the element stored in element code data storage 7100. While the data store is shown in FIG. 7 as having separate storage for the element data, usage rules, selection rules, and code, one of ordinary skill in the art with the benefit of the present disclosure will appreciate other storage schemes may be utilized.

When a user selects the mobile wallet application, controller 7030 works with the user interface creator 7050 to provide a user interface for the user. For example, a user interface such as that shown in FIGS. 1-3. Controller 7030 may receive an indication that the user wishes to select an element and may begin to process the element—for example, by performing the operations of FIG. 5 by consulting with data in the data layer 7060, such as element data in element data storage 7070, usage rules in usage rules storage 7080, selection rules in selection rules data storage 7090. Once an element is selected, the element code may be loaded and executed from element code data storage 7100. As part of the selection of the element and verifying (in some examples) that the usage meets the usage rules, the controller 7030 may consult the context collector 7040 to determine a context of the user.

Context collector 7040 may query sensors 7110 for information about the current state of the user. Sensors 7110 may include such sensors as a Global Positioning System (GPS) sensor 7120 which may provide a geolocation of the user. Other sensors may include a date and time sensor 7130, which may be an operating system service, a biometric sensor 7140 and video sensors 7150. GPS sensors may be utilized to determine a geofence for purposes of usage and/or selection rules. For example, the usage rules may restrict or specify certain locations where the element may be utilized. GPS sensors may also be utilized to determine a location for purposes of determining a merchant for payments. Usage and/or selection rules may allow a payment element to be utilized with certain merchants, certain types of merchants, or the like. The user's geolocation may be compared to geolocations of merchants in a database to determine a merchant that the user is proximate to.

In some examples, biometric sensors 7140 may capture biometric information of a user. For example, heart rate, breathing rate, glucose level, pulse, and the like. Biometric information may also include motion and activity tracking, such as how many steps a person has taken. In some examples, a particular mobile wallet element (e.g., a rewards card or payment card) may be activated (e.g., the usage rules may allow the element to be utilized) when particular health related goals have been achieved. For example, once the person has taken a predetermined number of steps, or done a certain amount of exercise.

Wireless communicator 7160 may implement one or more wireless protocols and may include one or more wireless transceivers. Example wireless communications implemented by the wireless communicator 7160 may include Near Field Communications (NFC), short range wireless communications (e.g., WIFI, BLUETOOTH, and other similar protocols with a typical range of 100 meters or less), cellular communications, and the like.

Element data storage 7070, usage rules storage 7080, selection rules data storage 7090, and element code data storage 7100 may be different data storage or the same data storage. In some examples, one or more of this data storage may be on a secure element (SE) of the computing device 7010. In some examples, one or more of this data storage may be in volatile or non-volatile memory of the computing device 7010. Modules shown in FIG. 7 are exemplary and one of ordinary skill in the art with the benefit of the present disclosure will appreciate that other organizations may be utilized.

Figure 8:
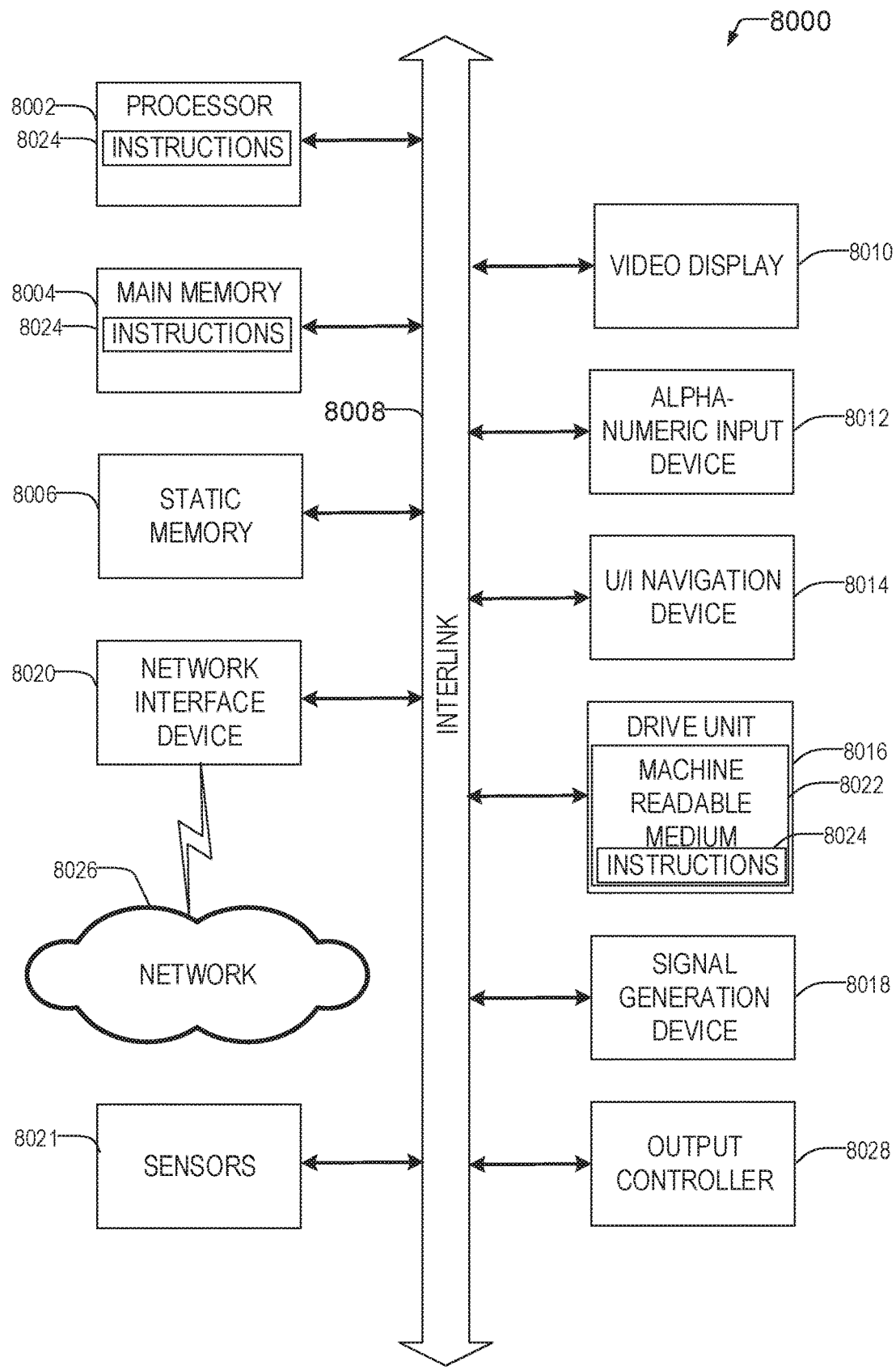
FIG. 8 is a block diagram illustrating an example of a machine upon which one or more embodiments may be implemented.

FIG. 8 illustrates a block diagram of an example machine 8000 upon which any one or more of the techniques (e.g., methodologies) discussed herein may perform. In alternative embodiments, the machine 8000 may operate as a stand-alone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be a computing device such as a smartphone, laptop, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, the machine 8000 may create a GUI such as shown in FIGS. 1-3, be configured to perform the method 5-6 and be configured to include the components of FIG. 7. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., drive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

What is claimed is:

1. A method of context-based element selection of a mobile wallet element from a digital wallet, the method comprising:
   causing one or more hardware processors to perform operations comprising:
      receiving a selection of the mobile wallet element from a user;
      determining that the mobile wallet element is a parent mobile wallet element with at least a first and a second child mobile wallet element corresponding to the parent mobile wallet element, wherein the first child mobile wallet element is a proximity card non-payment mobile wallet element and the second child mobile wallet element is a payment mobile wallet element;
      determining a context of the user, the context of the user including biometric information of the user and an intended usage of the mobile wallet element, wherein the intended usage includes data describing a transaction initiated using the mobile wallet element;
      determining an activity goal has been met based on activity tracking information provided in the biometric information;
      activating the first child mobile wallet element based on meeting the activity goal;
      selecting the first child mobile wallet element based upon a selection rule corresponding to the mobile wallet element and the context of the user, wherein the selection rule specifies criteria for selecting the first child mobile wallet element based on the data describing the transaction and the biometric information; and
      executing the first child mobile wallet element to complete a transaction according to the intended usage.

2. The method of claim 1, comprising:
   determining that a usage restriction corresponding to the first child mobile wallet element indicates that a notification is to be sent when the transaction is completed; and
   responsive to completing the transaction, sending the notification over a network to a third party, the third party not involved in approving the transaction.

3. The method of claim 1, comprising:
   receiving a second selection of the mobile wallet element;
   determine a second context of the user, the second context of the user including a second intended usage of the mobile wallet element;
   selecting the first child mobile wallet element based upon the selection rule corresponding to the mobile wallet element and the second context of the user;
   determining that a usage rule corresponding to the first child mobile wallet element forbids the second intended usage; and
   denying a transaction for the second intended usage.

4. The method of claim 1, comprising:
   providing a GUI for selection of mobile wallet elements, including the mobile wallet element; and
   wherein receiving the selection of the mobile wallet element includes receiving a selection of a graphical user interface element representing the mobile wallet element.

5. The method of claim 4, wherein the GUI for selection shows a graphical representation of the mobile wallet element and icons within that graphical representation that represent the first and second child mobile wallet elements.

6. The method of claim 1, comprising:
   receiving a second selection of the mobile wallet element;
   determine a second context of the user, the second context of the user including a second intended usage of the mobile wallet element;
   selecting the second child mobile wallet element based upon the selection rule corresponding to the mobile wallet element and the second context of the user;
   determining that the second child mobile wallet element also has a third and fourth child mobile wallet element;
   selecting the third child mobile wallet element based upon second selection rules corresponding to the second child mobile wallet element; and
   executing the third child mobile wallet element to complete a transaction.

7. The method of claim 1 wherein executing the first child mobile wallet element to complete a transaction comprises communicating with a transacting party using near field communications.

8. The method of claim 1, wherein executing the first child mobile wallet element to complete a transaction comprises:
   retrieving code corresponding to the first child mobile wallet element from storage; and
   causing the one or more hardware processors to execute at least a portion of the code.

9. A system for context-based element selection of a mobile wallet element from a digital wallet, the system comprising:
   a computer processor;
   a memory, the memory comprising instructions, which when performed by the computer processor, cause the computer processor to perform operations comprising:
      causing one or more hardware processors to perform operations comprising:
         receiving a selection of the mobile wallet element from a user;
         determining that the mobile wallet element is a parent mobile wallet element with at least a first and a second child mobile wallet element corresponding to the parent mobile wallet element, wherein the first child mobile wallet element is a proximity card non-payment mobile wallet element and the second child mobile wallet element is a payment mobile wallet element;
         determining a context of the user, the context of the user including biometric information of the user and an intended usage of the mobile wallet element, wherein the intended usage includes data describing a transaction initiated using the mobile wallet element;
         determining an activity goal has been met based on activity tracking information provided in the biometric information;
         activating the first child mobile wallet element based on meeting the activity goal;
         selecting the first child mobile wallet element based upon a selection rule corresponding to the mobile wallet element and the context of the user, wherein the selection rule specifies criteria for selecting the first child mobile wallet element based on the data describing the transaction and the biometric information; and executing the first child mobile wallet element to complete a transaction according to the intended usage.

10. The system of claim 9, wherein the operations further comprise:
   determining that a usage restriction corresponding to the first child mobile wallet element indicates that a notification is to be sent when the transaction is completed; and
   responsive to completing the transaction, sending the notification over a network to a third party, the third party not involved in approving the transaction.

11. The system of claim 9, wherein the operations further comprise:
   receiving a second selection of the mobile wallet element;
   determine a second context of the user, the second context of the user including a second intended usage of the mobile wallet element;
   selecting the first child mobile wallet element based upon the selection rule corresponding to the mobile wallet element and the second context of the user;
   determining that a usage rule corresponding to the first child mobile wallet element forbids the second intended usage; and
   denying a transaction for the second intended usage.

12. The system of claim 9, wherein the operations further comprise:
   providing a GUI for selection of mobile wallet elements, including the mobile wallet element; and
   wherein receiving the selection of the mobile wallet element includes receiving a selection of a graphical user interface element representing the mobile wallet element.

13. The system of claim 12, wherein the GUI for selection shows a graphical representation of the mobile wallet element and icons within that graphical representation that represent the first and second child mobile wallet elements.

14. The system of claim 9, wherein the operations further comprise:
   receiving a second selection of the mobile wallet element;
   determine a second context of the user, the second context of the user including a second intended usage of the mobile wallet element;
   selecting the second child mobile wallet element based upon the selection rule corresponding to the mobile wallet element and the second context of the user;
   determining that the second child mobile wallet element also has a third and fourth child mobile wallet element;
   selecting the third child mobile wallet element based upon second selection rules corresponding to the second child mobile wallet element; and
   executing the third child mobile wallet element to complete a transaction.

15. The system of claim 9 wherein the operations of executing the first child mobile wallet element to complete a transaction comprises communicating with a transacting party using near field communications.

16. The system of claim 9, wherein the operations of executing the first child mobile wallet element to complete a transaction comprises:
   retrieving code corresponding to the first child mobile wallet element from storage; and
   causing the one or more hardware processors to execute at least a portion of the code.

17. A non-transitory machine-readable medium for context-based element selection of a mobile wallet element from a digital wallet, the machine-readable medium comprising instructions, which when executed by a machine, causes the machine to perform operations comprising:
   causing one or more hardware processors to perform operations comprising:
   receiving a selection of the mobile wallet element from a user;
   determining that the mobile wallet element is a parent mobile wallet element with at least a first and a second child mobile wallet element corresponding to the parent mobile wallet element, wherein the first child mobile wallet element is a proximity card non-payment mobile wallet element and the second child mobile wallet element is a payment mobile wallet element;
   determining a context of the user, the context of the user including biometric information of the user and an intended usage of the mobile wallet element, wherein the intended usage includes data describing a transaction initiated using the mobile wallet element;
   determining an activity goal has been met based on activity tracking information provided in the biometric information;
   activating the first child mobile wallet element based on meeting the activity goal;
   selecting the first child mobile wallet element based upon a selection rule corresponding to the mobile wallet element and the context of the user, wherein the selection rule specifies criteria for selecting the first child mobile wallet element based on the data describing the transaction and the biometric information; and
   executing the first child mobile wallet element to complete a transaction according to the intended usage.

18. The machine-readable medium of claim 17, wherein the operations further comprise:
   determining that a usage restriction corresponding to the first child mobile wallet element indicates that a notification is to be sent when the transaction is completed; and
   responsive to completing the transaction, sending the notification over a network to a third party, the third party not involved in approving the transaction.

19. The machine-readable medium of claim 17, wherein the operations further comprise:
   receiving a second selection of the mobile wallet element;
   determine a second context of the user, the second context of the user including a second intended usage of the mobile wallet element;
   selecting the first child mobile wallet element based upon the selection rule corresponding to the mobile wallet element and the second context of the user;
   determining that a usage rule corresponding to the first child mobile wallet element forbids the second intended usage; and
   denying a transaction for the second intended usage.

20. The machine-readable medium of claim 17, wherein the operations further comprise:
   providing a GUI for selection of mobile wallet elements, including the mobile wallet element; and
   wherein receiving the selection of the mobile wallet element includes receiving a selection of a graphical user interface element representing the mobile wallet element.

* * * * *

UNITED STATES PATENT AND TRADEMARK OFFICE
CERTIFICATE OF CORRECTION

PATENT NO. : 10,949,836 B1  
APPLICATION NO. : 15/669446  
DATED : March 16, 2021  
INVENTOR(S) : Joon Maeng Page 1 of 1

It is certified that error appears in the above-identified patent and that said Letters Patent is hereby corrected as shown below:

In the Claims

In Column 12, Line 34, in Claim 18, before "machine-readable", insert --non-transitory--

In Column 12, Line 43, in Claim 19, before "machine-readable", insert --non-transitory--

In Column 12, Line 56, in Claim 20, before "machine-readable", insert --non-transitory--

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*